United States Patent [19]
Hiestand

[11] Patent Number: 5,582,432
[45] Date of Patent: Dec. 10, 1996

[54] DEVICE FOR TRANSFERRING A MEDIUM

[76] Inventor: Thomas Hiestand, Mühlweg 2, D-88630, Pfullendorf, Germany

[21] Appl. No.: 386,556

[22] Filed: Feb. 10, 1995

[30] Foreign Application Priority Data

Feb. 12, 1994 [DE] Germany .......................... 44 04 547.6

[51] Int. Cl.⁶ ........................... F15B 13/04; F16L 27/087
[52] U.S. Cl. ........................ 285/190; 285/272; 285/98; 285/900; 137/580
[58] Field of Search .................................... 285/272, 190, 285/136, 134, 98, 95, 900; 137/580

[56] References Cited

U.S. PATENT DOCUMENTS

| | | | |
|---|---|---|---|
| 3,771,803 | 11/1973 | Hiestand | 279/4 |
| 4,065,159 | 12/1977 | Leroy et al. | 285/136 |
| 4,108,294 | 8/1978 | Stewart et al. | |
| 4,449,738 | 5/1984 | Hotger | 285/190 |
| 4,828,292 | 5/1989 | Jansen | 285/136 |
| 5,052,724 | 10/1991 | Konrad et al. | 285/190 |
| 5,269,345 | 12/1993 | Hiestand et al. | 137/580 |
| 5,348,352 | 9/1994 | Ciez et al. | 285/190 |

FOREIGN PATENT DOCUMENTS

| | | |
|---|---|---|
| 4124153 | 1/1993 | Germany . |
| 357335 | 9/1931 | United Kingdom . |

Primary Examiner—Eric K. Nicholson
Attorney, Agent, or Firm—Robert W. Becker & Associates

[57] ABSTRACT

A device for transferring a medium to a servo device has a first component and a second component positioned in the first component so as to be rotatable about an axis of rotation. The first component is displaceable to a limited extent relative to the second component along the axis of rotation. An annular chamber is located between the first and second components and is delimited axially on one side by the first component and on the other side by the second component. First and second radial sealing gaps are provided on opposite sides of the annular chamber. The annular chamber has a circumferential sidewall that is slanted relative to the axis of rotation such that a first surface of the first component forming the circumferential sidewall of the annular chamber and a second surface of the first component forming the radially extending annular surface of the annular chamber are positioned at an acute angle to one another. A pressure chamber communicates with one of the radial sealing gaps for returning the first component into the initial position. A third radial sealing gap is connected to the pressure chamber for relieving it. An inlet line introduces a medium into the annular chamber and an outlet line guides the medium from the annular chamber to the servo device.

15 Claims, 4 Drawing Sheets

5,582,432

DEVICE FOR TRANSFERRING A MEDIUM

BACKGROUND OF THE INVENTION

The present invention relates to a device for transferring a medium from a first component into a rotatably driven second component, coordinated, for example, with a servo device or consuming, whereby between the two components an annular chamber is provided that has connected thereto an inlet line for the medium as well as an outlet line communicating with the consuming device for supplying the medium to be transferred to the servo device. Adjacent to the annular chamber a first and a second radially extending sealing gap are provided, whereby the annular chamber in the axial direction of the device is enclosed on one side by the first component and on the other side by the second component.

From German Offenlegungsschrift 41 24 153 a pressure transfer device of the aforementioned kind is known which has been used successfully in practice. However, it has been shown that for a sudden pressure buildup in the annular chamber, as occurs during switching processes, the first component is forced against the second component for a short period of time and rests thereat. This can cause at both components in the area of the sealing gaps damage due to the unavoidable gliding friction, especially at high rpms. This often results in the sealing gaps loosing their effectiveness already after a short service time. With additional control chambers arranged downstream of the sealing gaps this can be prevented to some extent. However, the required expenditure is considerable. Furthermore, the range of applications for such a pressure transfer device is limited.

It is therefore an object of the present invention to provide a device for transferring a medium from one component to another component with which within the annular chamber a high pressure can be built up suddenly without the two components being pressed against one another by this high pressure. Instead, the first component, upon an axial displacement resulting from a switching operation, should be resting with a low force at the second component only for a very short period of time so that frictional forces causing damage within the area of the sealing gap can be practically completely eliminated. Furthermore, during the transfer of the medium the first component should be in a floating condition so that it is substantially laterally supported by the medium whereby a long service life and reliable operation of the device should be ensured even with a low constructive expenditure.

SUMMARY OF THE INVENTION

A device for transferring a medium from a first component to a second component connected to a consuming device according to the present invention is primarily characterized by:

A first component;

A second component positioned in the first component so as to be rotatable in the first component about an axis of rotation;

The first component being displacable, from an initial position, relative to the second component along the axis of rotation to a limited extent;

An annular chamber located between the first and the second components;

The annular chamber delimited, in the direction of said axis of rotation, on one side by the first component and on the other side by the second component;

A first radial sealing gap positioned at that one side of the annular chamber and a second radial sealing gap positioned at that other side of the annular chamber;

The annular chamber having at least one circumferential sidewall in the direction of the axis of rotation that is slanted relative to the axis of rotation such that a first surface of the first component, forming the circumferential sidewall of the annular chamber, and a second surface of the first component, forming a radially extending annular surface of the annular chamber, are positioned at an acute angle to one another;

A pressure chamber communicating with one of the first and the second radial sealing gaps, for returning the first component relative to the second component into the initial position;

A third radial sealing gap connected to the pressure chamber for relieving the pressure chamber;

An inlet line connected to the annular chamber for introducing a medium into the annular chamber; and An outlet line connected to the annular chamber for guiding the medium from the annular chamber to a consuming device.

Advantageously, the slant angle is selected such that a projected surface area of the circumferential sidewall is substantially equal to the radially extending annular surface.

Preferably, the device further comprises a first and a second collecting chamber wherein the first radial sealing gap is connected to the first collecting chamber and the third sealing gap is connected to the second collecting chamber.

Advantageously, the device further comprises channels for connecting the first and the third radial sealing gaps to the first and second collecting chambers.

Preferably, the first and second collecting chambers are located in the first component. Expediently, the first and second radial sealing gaps are connected to the atmosphere. Preferably, the device further comprises channels for connecting the first and second collecting chambers to the atmosphere.

In a preferred embodiment of the present invention, the pressure chamber is loaded via the second radial sealing gap and has a pressure surface provided at the first component. The second radial sealing gap has a radially extending annular surface adjacent to the second surface of the annular chamber at the first component. The pressure surface of the pressure chamber is greater than the sum of the radially extending annular surface of the second radial sealing gap and the second surface of the annular chamber.

Advantageously, the first radial sealing gap has a radial sealing end face at the first component and the first surface of the first component, forming the circumferential sidewall of the annular chamber, is directly connected to the sealing end face so as to diverge therefrom.

In another embodiment of the present invention the first component is comprised of two parts. The second radial sealing gap has a radial sealing end face at the first component. The first surface of the first component, forming the circumferential sidewall of the annular chamber, is directly connected to the radial sealing end face so as to diverge therefrom.

Preferably, the first component is directly supported at the second component so as to be axially displacable to a limited extent. Preferably, the second component has a circumferential annular groove in which groove the first component is positioned. Advantageously, the second component is comprised of two connected rings.

In a preferred embodiment of the present invention the first component engages over the second component. Preferably, the first component is comprised of two connected rings.

According to the present invention, the first component is supported relative to the second component so as to be displacable axially to a limited extent. Furthermore, the annular chamber is slanted relative to the rotational axis of the second component or, in the alternative, is wedge-shaped, when viewed in cross-section, such that the circumferential surface delimiting the annular chamber radially outwardly as well as the radially oriented annular surface of the first component are arranged at an acute angle α relative to one another. For returning the first component into the initial position, a pressure chamber is arranged between the first component and the second component. This pressure chamber communicates with the radially oriented sealing gap and chamber can be relieved via a third radially extending sealing gap.

It is expedient that in order to achieve a floating condition of the first component, the slant angle of the annular chamber, respectively, of the radially outwardly delimiting circumferential surface of the first component is selected such that the projected surface area of the circumferential surface at the first component corresponds substantially to the radial annular surface of the first component delimiting the annular chamber axially.

It is furthermore advantageous to connect the first and the third radially extending sealing gaps directly or via channels to a respective collecting chamber or to the atmosphere whereby the collecting chambers are provided preferably within the first component.

Furthermore, the effective pressure surface of the pressure chamber provided at the first component and loadable preferably via the second radially extending annular sealing gap should be greater than the sum of the annular surfaces of the first component delimiting the annular chamber and the second radial sealing gap.

It is furthermore expedient that the circumferential surface of the first component delimiting the annular chamber radially outwardly is directly connected to the end face of the first radial sealing gap at the first component so as to diverge therefrom or that, for a two-part first component, the circumferential surface delimiting the annular chamber radially outwardly is connected directly to the radially extending annular surface of the first component coordinated with the second radially extending annular sealing gap so as to diverge therefrom.

The first component can be directly supported at the second component so as to be displacable in the axial direction to a limited extent whereby the first component is positioned in a circumferential annular groove of the second component which is preferably comprised of two connected rings. According to another inventive embodiment it is also possible that the first component is comprised of two connected rings and engages over the second component.

A device embodied according to the present invention ensures that the first component does not come into frictional contact with the second component in the lateral direction, not even for a short period of time during switching of the device. Due to the embodiment of the cross-sectional surface areas of the annular gap it is ensured that the lateral forces acting on the first component which is axially displacable to a limited extent, the forces resulting from the supplied medium are substantially compensated so that the first component is not forced by the medium against the second component and the radial surfaces delimiting the sealing gap cannot be damaged by frictional forces. Since the medium can be diverted from both annular sealing gaps positioned at both sides of the annular chamber, the first component is maintained in a floating condition during transfer of the medium, so that friction between the two components is drastically reduced.

Since the radial annular surface of the first component, which delimits the annular chamber, is slightly greater than the projected surface of the circumferential surface area of the first component delimiting the annular chamber radially outwardly in order to be able to mount to the two components, the first component is always loaded to a certain extent in the direction toward the second sealing gap. This results in that the first and second sealing gaps during transfer of the medium are opened slowly. Since in this case the third sealing gap is closed and a pressure is being built up in the pressure chamber between the two components, the first component is automatically returned after a short period of time so that the pressure in the pressure chamber is reduced because the third sealing gap is opened. The first component is thus axially displaced between the two end faces of the second component without resting under pressure at these end faces and without being in frictional connection with them. Despite the minimal constructive expenditure to achieve this goal, a reliable transfer of medium and a long service life of the device are ensured.

BRIEF DESCRIPTION OF THE DRAWINGS

The object and advantages of the present invention will appear more clearly from the following specification in conjunction with the accompanying drawings, in which.

DESCRIPTION OF PREFERRED EMBODIMENTS

The present invention will now be described in detail with the aid of several specific embodiments utilizing FIGS. 1 through 4.

Figure 1:
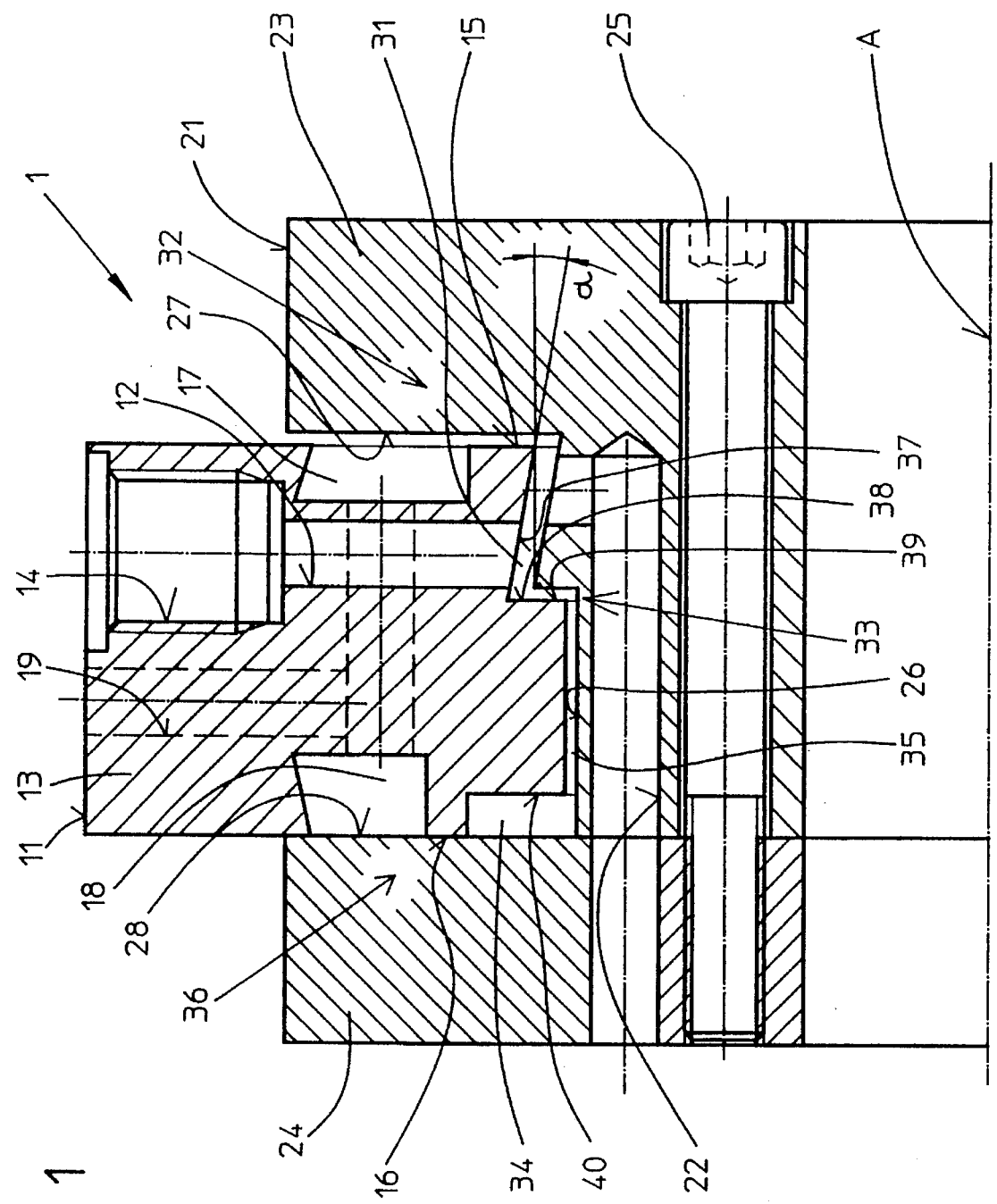
FIG. 1 shows the device before beginning a medium transfer.
Figure 2:
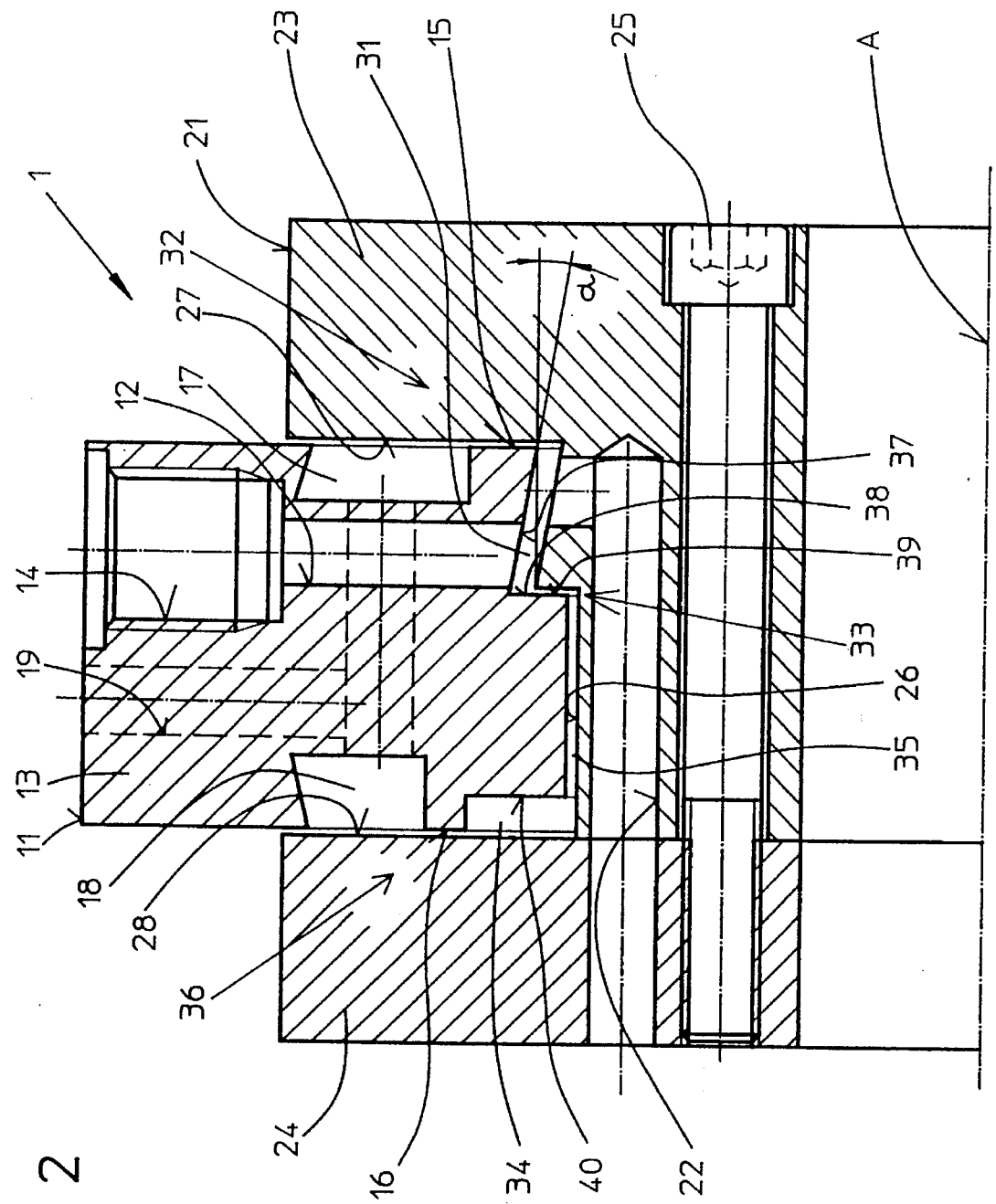
FIG. 2 shows the device of FIG. 1 during medium transfer.
Figure 3:
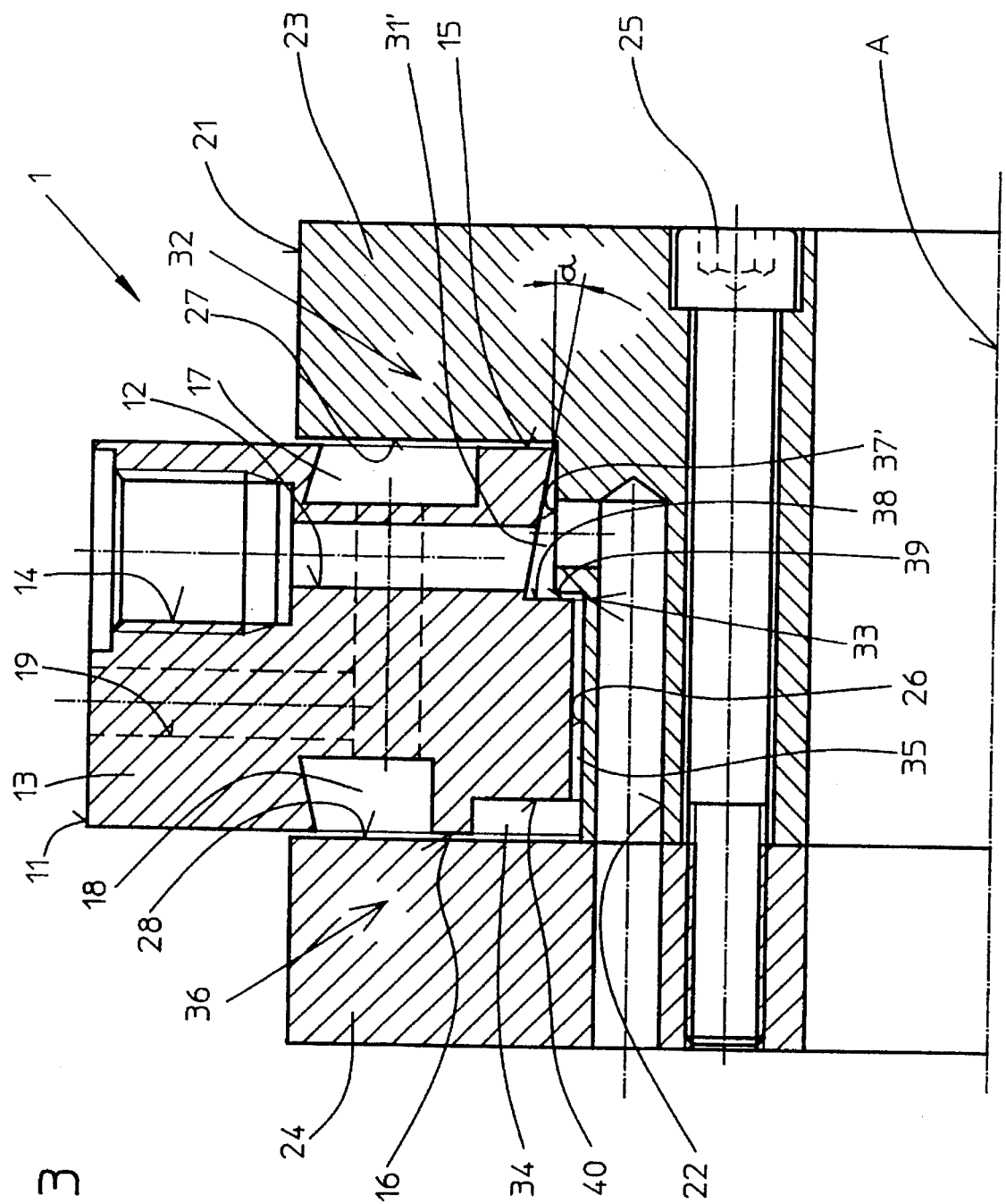
FIG. 3 shows the device of FIG. 2 with an alternative variant of the annular chamber between the two components.

The device 1 represented in FIGS. 1 to 3 serves for transferring a medium from a first stationary component 11 to a rotatably driven second component 21 which is coordinated with a non-represented servo device (consuming device) in order to supply this servo device with the medium. Between the two components 11 and 21 an annular chamber 31 is provided to which is connected an inlet line 12 as well as an outlet line 22 connected to the servo device. Adjacent to the annular chamber 31 is a first radially oriented sealing gap 32 and a second radially oriented sealing gap 33 which are delimited by the two components 11 and 21. The annular chamber 31 is thus enclosed in the axial direction (direction of rotation) to the right by the second component 21 and to the left by the first component 11.

The first component 11 in this embodiment is comprised of a ring 13 having a connector 14 for a high pressure hose for supplying the medium to be transferred. Furthermore, the ring 13 is provided at its lateral end faces 15, 16 with collecting chambers 17 and 18 which are connected to a return line 19. The second component 21 is comprised of two rings 23 and 24 which are connected to one another with screws 25. An annular groove 26 is formed by the two rings 23, 24. The first component 11 in the form of the ring 13 is inserted into this annular groove 26. The ring 13 is thus supported at the end faces 27 and 28 of the second component 21 and is thus displacable to a limited extent relative to these end faces 27, 28 in the axial direction.

The annular chamber 31 is arranged at a slant angle α to the axis of rotation A of the second component 21 so that the circumferential surface 37 as well as the adjacent annular surface 38 of the first component 11 form an acute angle relative to one another. The slant angle α is selected such that the projected surface area of the circumferential surface 37 corresponds in its size approximately to the annular surface 38 so that upon loading these surfaces with the medium to be transferred the resulting counteracting forces are in equilibrium.

Between the first component 11 and the second component 21 a third sealing gap 36 is provided opposite the first radially extending sealing gap 32. The third sealing gap 36 delimits a pressure chamber 34 that communicates via an annular gap 35 with the second sealing gap 33. The pressure surface 40 provided at the first component 11 and loaded by the medium is greater than the sum of the radially extending annular surfaces 38 and 39 of the first component 11 which delimit the annular chamber 31 and the second sealing gap 33.

FIG. 1 shows the inventive device 1 in an initial position. When in this initial position the annular chamber 31 of the device is supplied via the line 12 with the medium, for example, an hydraulic liquid, this liquid flows from the stationary first component 11 via the line 22 into a non-represented consuming (servo) device that rotates together with the second component 21. Since the first component 11 with its end face 16 rests at the end face 28 of the second component 21 without exerting a great axially oriented force, the third sealing slot 36 is substantially closed, while the first and the second sealing gaps 32 and 33, on the other hand, are open. Thus, the medium flows via the first sealing gap 32 into the collecting chamber 17 and via the second sealing gap 33 into the pressure chamber 34.

Already after a short period of time the pressure within the pressure chamber 34 is reduced so that the first component 11 is moved into the position represented in FIG. 2 since the pressure surface 40 is greater than the sum of the two annular surfaces 38 and 39 arranged opposite that pressure surface 40. During the pressure medium transfer the first component 11 remains in this position, i.e., it floats essentially in the annular groove 26 of the second component 21. This is so because, when the third sealing slot 36 is open, the first component 11 is pushed to the left due to the force acting on the annular surfaces 38, 39, reduced by the counter force acting on the circumferential surface 37, and, when the first and second sealing gaps 32, 33 are open, the first component 11 is returned to the right due to the force acting on the pressure surface 40.

FIG. 3 shows that the annular chamber 31' between the first component 11 and the second component 21 is of a wedge-shaped cross-sectional embodiment. The circumferential surface 37' of this annular chamber 31' at the second component 21 is embodied as a cylindrical outer mantle surface.

Figure 4:
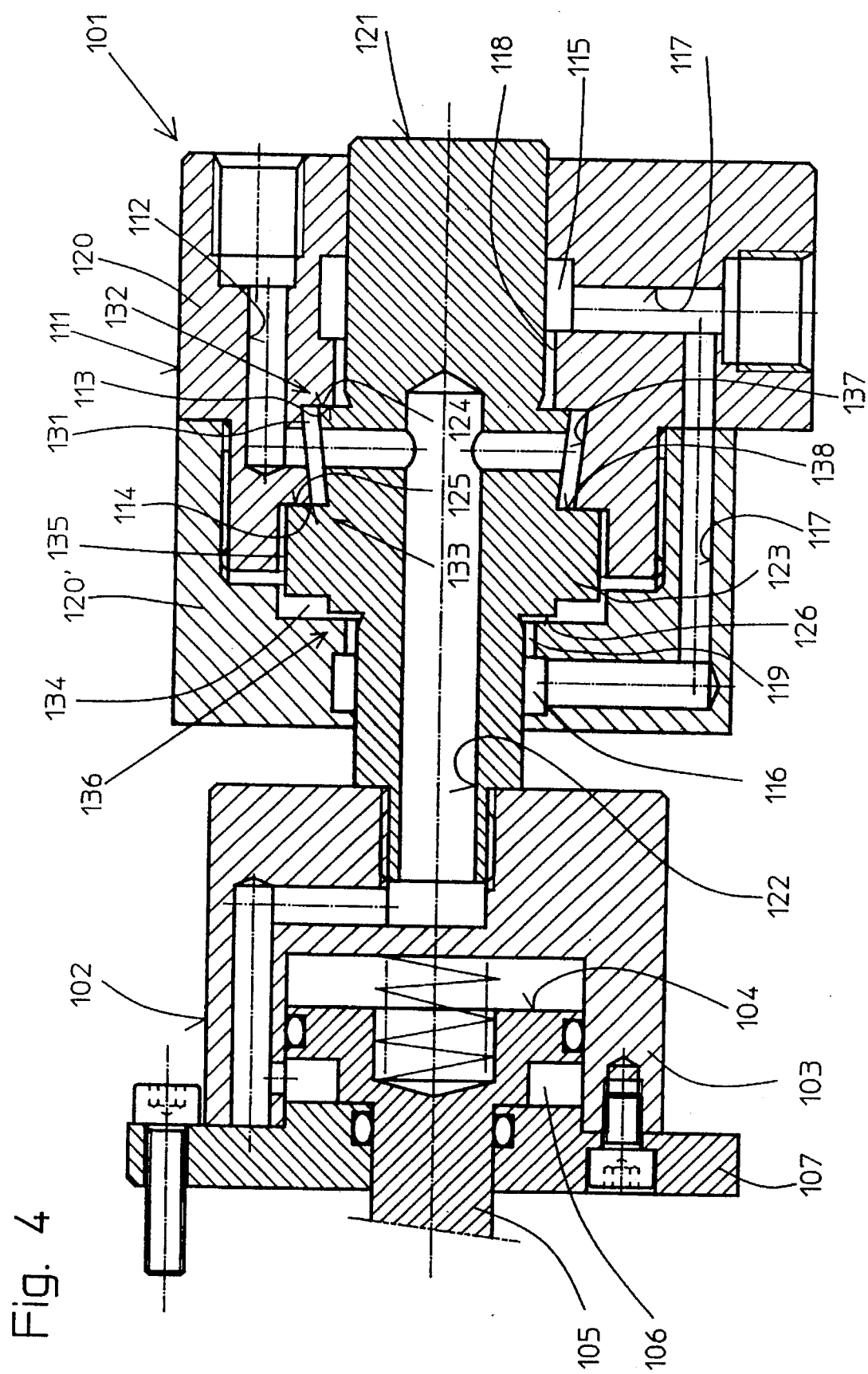
FIG. 4 shows another embodiment of the inventive device for transferring a medium before beginning the medium transfer.

In the embodiment according to FIG. 4 the device 101 is coordinated with a servo device 102 which is comprised of a cylinder 103 that is connected with flanges 107 to a working machine and of a piston 104 inserted into the cylinder 103 and loadable by a pressure medium. The piston rod 105 of the piston 104 is connected to a control member to be actuated. The control member is actuated when a pressure medium is supplied from the first component 101 via the second component 121 connected to the cylinder 103 into the pressure chamber 106 of the servo device 102.

The first component 111 in this embodiment is comprised of two connected (with screws) rings 120 and 120' that engage over the second component 121 that is in the form of a shaft 123. Between the two components 111 and 121 an annular chamber 131 is provided which is slanted relative to the axial direction (rotational axis) of the second component 121. Connected to the annular chamber 131 is an inlet line 112 and an outlet line 122 that is connected to the servo device 102.

The annular chamber 131 has coordinated therewith a first radially extending sealing gap 132 and a second radially extending sealing gap 133 that are delimited by the end faces 113, 114 of the first component 111 and the end faces 124, 125 of the second component 121. Furthermore, between the first component 111 and the second component 121 a pressure chamber 134 is provided that is connected via the annular gap 135 to the second sealing gap 133. The pressure chamber 134 can be relieved via a third radially extending sealing gap 136.

The pressure medium which flows out via the sealing gaps 132, 133, and 136 is collected in the collecting chambers 115 and 116 which are connected to a return line 117. The connection between the sealing gaps 132 and 136 and the collecting chambers 115, 116 is achieved with channels 118, 119 which are machined into the rings 120, 120' of the first component 111.

Upon supplying a pressure medium the first component 111, which is displacable to a limited extent in the axial direction between the end faces 124 and 126 of the second component, is maintained in a floating condition in the same manner as described in connection with the embodiment of FIG. 1 due to the slantedly arranged annular chamber 131: The forces acting on the slantedly arranged circumferential surface 137 and on the radially extending annular surface 138 of the first component 111 that extends at an acute angle to the circumferential surface 137 are substantially in equilibrium, so that the component 111 is returned automatically when pressure is generated within the pressure chamber 134.

The present invention is, of course, in no way restricted to the specific disclosure of the specification and drawings, but also encompasses any modifications within the scope of the appended claims.

What I claim is:

1. A device for transferring a medium from a first component to a second component connected to a consuming device, said device comprising:

a first component;

a second component positioned in said first component so as to be rotatable in said first component about an axis of rotation;

said first component being displaceable, from an initial position, relative to said second component along said axis of rotation to a limited extent;

an annular chamber located between said first and said second components;

said annular chamber delimited, in a direction of said axis of rotation, on one side by said first component and on the other side by said second component;

a first radial sealing gap positioned at said one side of said annular chamber and a second radial sealing gap positioned at said other side of said annular chamber;

said annular chamber having at least one circumferential sidewall that is slanted at a slant angle relative to said axis of rotation such that a first surface of said first component, forming said circumferential sidewall of said annular chamber, and a second surface of said first component, forming a radially extending annular surface of said annular chamber, are positioned at an acute angle to one another;

a pressure chamber communicating with one of said first and said second radial sealing gaps;

a third radial sealing gap connected to said pressure chamber for relieving said pressure chamber;

said third radial sealing gap opening and closing in a direction opposite to said first and second radial sealing gaps;

an inlet line connected to said annular chamber for introducing a medium into said annular chamber;

an outlet line connected to said annular chamber for guiding the medium from said annular chamber to a consuming device;

said first component having opposed end faces;

said first component, when the pressure medium is transferred via said annular chamber to the consuming device, being maintained in equilibrium by and supported via the pressure medium with said opposed end faces at said second component;

said pressure chamber positioned between said first component and said second component and cooperating with said first and second radial sealing gaps for maintaining in equilibrium said first component.

2. A device according to claim 1, wherein said slant angle is selected such that a projected surface area of said circumferential sidewall is substantially equal to said radially extending annular surface.

3. A device according to claim 1, further comprising a first and a second collecting chamber, wherein said first radial sealing gap is connected to said first collecting chamber and wherein said third radial sealing gap is connected to said second collecting chamber.

4. A device according to claim 3, further comprising channels for connecting said first and said third radial sealing gaps to said first and second collecting chambers.

5. A device according to claim 3, wherein said first and second collecting chambers are located in said first component.

6. A device according to claim 1, wherein said first and said second radial sealing gaps are connected to the atmosphere.

7. A device according to claim 6, further comprising channels for connecting said first and said second collecting chambers to the atmosphere.

8. A device according to claim 1, wherein:

said pressure chamber is loaded via said second radial sealing gap and has a pressure surface provided at said first component;

said second radial sealing gap has a radially extending annular surface adjacent to said second surface of said annular chamber at said first component; and said pressure surface of said pressure chamber is greater than the sum of said radially extending annular surface of said second radial sealing gap and said second surface of said annular chamber.

9. A device according to claim 1, wherein said first radial sealing gap has a radial sealing end face at said first component and wherein said first surface of said first component, forming said circumferential sidewall of said annular chamber, is directly connected to said sealing end face so as to diverge therefrom.

10. A device according to claim 1, wherein:

said first component is comprised of two parts;

said second radial sealing gap has a radial sealing end face at said first component; and said first surface of said first component, forming said circumferential sidewall of said annular chamber, is directly connected to said radial sealing end face so as to diverge therefrom.

11. A device according to claim 1, wherein said first component is directly supported at said second component so as to be axially displaceable to a limited extend.

12. A device according to claim 11, wherein said second component has a circumferential annular groove in which groove said first component is positioned.

13. A device according to claim 12, wherein said second component is comprised of two connected rings.

14. A device according to claim 11, wherein said first component engages over said second component.

15. A device according to claim 14, wherein said first component is comprised of two connected rings.

* * * * *